(12) United States Patent
Ganesan et al.

(10) Patent No.: US 7,903,799 B1
(45) Date of Patent: Mar. 8, 2011

(54) METHOD AND APPARATUS FOR PROVIDING A COMMUNICATIONS SERVICE FEATURE FOR A COMMUNICATION THROUGH A NETWORK

(75) Inventors: Sekar Ganesan, Tinton Falls, NJ (US);
Anurag Goel, Tinton Falls, NJ (US);
Jephthah F. Liddie, Freehold, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 08/942,528

(22) Filed: Oct. 2, 1997

(51) Int. Cl.
*H04M 3/42* (2006.01)
*H04M 7/00* (2006.01)

(52) U.S. Cl. .......... 379/201.02; 379/201.12; 379/207.02; 379/207.15; 379/221.14; 455/414.1

(58) Field of Classification Search .................. None
See application file for complete search history.

(56) References Cited

U.S. PATENT DOCUMENTS

| | | | | |
|---|---|---|---|---|
| 5,918,173 | A * | 6/1999 | Rosa | 455/411 |
| 6,311,055 | B1 * | 10/2001 | Boltz | 455/414.1 |
| 6,397,058 | B1 * | 5/2002 | Thibert et al. | 455/414.1 |

* cited by examiner

*Primary Examiner* — Harry S Hong
(74) *Attorney, Agent, or Firm* — Greenblum & Bernstein, P.L.C.

(57) ABSTRACT

A method and apparatus for providing a communications service feature to a party communicating through a network. It is first determined if the party making the communication is a subscriber based on an identifier associated with the party and a local database containing a subset of subscriber identifiers. It is then verified that the identifier associated with the party is in the subset of identifiers that would be included in this local database. For those identifiers that are not in the local database and that are not in the subset of identifiers that would be included in the local database, a global database containing all subscriber identifiers is queried to determine if the party is a subscriber. It can also be verified that the network provider knows the identifier of the party making the communication and that the provider is able to provide the communications service feature for the particular communication. If the party is a subscriber and the above conditions are met, the communications service feature is provided.

37 Claims, 3 Drawing Sheets

METHOD AND APPARATUS FOR
PROVIDING A COMMUNICATIONS SERVICE
FEATURE FOR A COMMUNICATION
THROUGH A NETWORK

FIELD OF THE INVENTION

The invention relates to providing a communications service feature for a communication through a network. More particularly, the invention relates to a method and apparatus for providing Positive Call Processing service for a long distance wireless telephone call.

BACKGROUND OF THE INVENTION

Communications network providers such as AT&T typically offer an array of communications service features. Each feature can be automatically provided to those users that subscribe to that feature. An example of such a communications service feature is Positive Call Processing (PCP) offered by AT&T. One aspect of PCP service lets a user enter an account code when making a long distance call. The account code appears on the user's monthly bill along with other billing information, letting the user segregate the cost of certain calls and perhaps pass along that cost to a third party. For example, a user could enter a five digit account code representing a certain client when making long distance calls on behalf of that client. At the end of the month, the user's long distance telephone bill would list all calls made with that account code together with the total cost of those calls. The user could then ask the client to pay the cost of those long distance telephone calls. Another aspect of PCP service allows employers to limit the types of non-local telephone calls made by employees. An employer could, for example, prevent some employees from dialing international telephone numbers while preventing other employees from making any non-local telephone calls.

When a communication is initiated by a user, the network provider must determine if that user subscribes to one or more communications service features. In the Public Switched Telephone Network (PSTN), this is typically done at the communications switch that routes telephone calls from the user's geographic region as reflected by the user's Numbering Plan Area (NPA) code, or "area code." This communications switch is commonly called the originating switch. Each originating switch contains a list, or table, of subscribers normally served by the switch. A single switch can route calls from several area codes, so a table of subscribers in an originating switch can include subscribers in any of several area codes served by that switch. When a communication is initiated by a user, the originating switch looks up that user's telephone number in the subscriber table to determine if the user subscribes to a communications service feature. If the user is a subscriber the communications service feature is then provided.

A problem arises when the owner of a wireless telephone wishes to subscribe to a communications service feature. The term "wireless" includes both cellular and Personal Communication Services (PCS) based communications. As long as the telephone is used within the geographic location covered by that telephone's normal originating switch, the originating switch can look up that user's telephone number in the subscriber table to determine if the user is a subscriber. If, however, the wireless telephone travels, or "roams," outside the geographic location served by that telephone's normal originating switch, the call will be routed through a different communications switch. Because the user's telephone number will not appear in the subscriber table maintained in the different switch, the different switch cannot recognize that the user is a subscriber and the communications service feature will not be provided. This is undesirable because users are generally not aware of switching system details and will not understand why the system is "not working." Moreover, a user of a wireless telephone who frequently travels outside the geographic location served by that telephone's normal originating switch will not be able to enjoy the benefits of communications service features.

To overcome this problem, a network provider can maintain a database of the telephone numbers of every subscriber, regardless of geographic location. Unfortunately, due to the large volume of telephone calls handled by a provider it is not practical to query a database of subscriber telephone numbers for every telephone call.

Another complication is that a long distance wireless telephone call may originally be routed in another provider's network. For example, in wireless networks an electronic switching system called the Mobile Telephone Switching Office (MTSO) or Mobile Switching Center (MSC) provides call-processing for users in a particular geographic region. The MTSO/MSC communicates with a user's wireless telephone through a set of base stations and will typically route a long distance call to a long distance network provider. The MTSO/MSC also forwards calls directed to a wireless user through a long distance network provider if the wireless user is located outside of their home geographic region. In this case, the user receiving the call, not the party making the call, pays for the long distance service. Therefore, the MTSO/MSC associates the user's telephone number with the call when routing it through the long distance network provider. Because of this, when a call is routed from a MTSO/MSC it is possible that the long distance network provider will not even know the telephone number of the user making the call.

With respect to PCP service, the problem is also complicated by the fact that the user's network provider may not control the billing records for a particular long distance wireless telephone call. Control of the billing records in such a situation is also called "recording take back." In this case, it would not make sense to provide the user with PCP service because account code information would not appear on the user's telephone bill, a main feature of PCP service.

In view of the foregoing, it can be appreciated that a substantial need exists for a method and apparatus for providing a communications service feature, such as PCP service, for a communication through a network, such as a long distance wireless telephone call.

SUMMARY OF THE INVENTION

The disadvantages of the art are alleviated to a great extent by the method and apparatus for delivering a communications service feature to a party communicating through a network. It is first determined if the party is a subscriber of the communications service feature based on an identifier associated with the party and a local database containing a subset of subscriber identifiers. Next, it is verified that the identifier associated with the party is in a subset of identifiers that would be included in this local database if the party was a subscriber. For those identifiers that are not in the local database and not in the subset of identifiers that would be included in the local database, a global database containing all subscriber identifiers is queried to determine if the party is a subscriber. Finally, if the party is a subscriber the communications service feature is provided.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
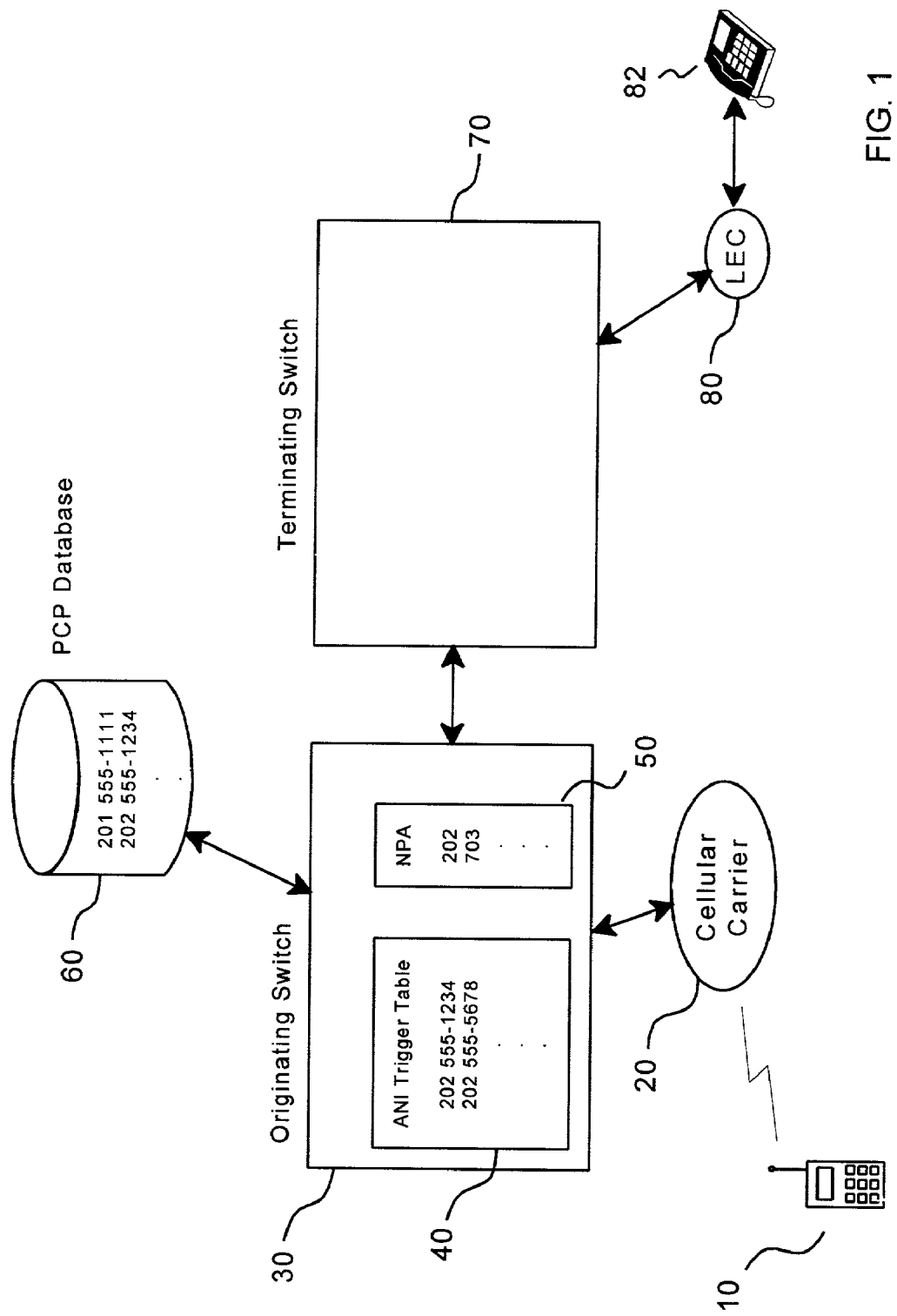
FIG. 1 a block diagram of a system suitable for practicing an embodiment of the present invention.

The present invention is directed to a method and apparatus for providing a communications service feature, such as Positive Call Processing service, to a party communicating through a network. Referring now in detail to the drawings wherein like parts are designated by like reference numerals throughout, there is illustrated in FIG. 1 a block diagram including elements of the Public Switched Telephone Network (PSTN), a communications network suitable for practicing an embodiment of the present invention. The PSTN includes an originating communications switch 30 and a terminating communications switch 70 connected to each other through one or more optical or electrical trunks. The originating and terminating switches 30, 70 can be any toll switch including, for example, a No. 4 Electronic Switching System (4ESS) switches available from Lucent Technologies, Inc.

Although communications switches typically route calls originating from a limited geographic region, the limited geographic region can include multiple area codes. Thus, a single communications switch can route calls from several different area codes, and the originating switch 30 contains an area code table 50 listing all of the area codes in the geographic region served by that switch. The access Numbering Plan Area (NPA) table in a 4ESS switch can serve as the area code table 50.

When a communication is initiated by a user, the network provider must determine if that user subscribes to one or more communications service features. In the PSTN, this determination is typically made at the originating switch 30 that normally routes telephone calls from the user's geographic region as reflected by the user's area code. The originating switch 30 looks up the user's telephone number in a subscriber table 40 that contains all subscriber telephone numbers having one of the area codes listed in area code table 50. Assuming that more than one communications switch can serve a single area code and that each switch would include all of the subscribers from that area code, a single user's telephone number can appear in the subscriber tables of several communication switches. The Automatic Number Identification (ANI) trigger table in a 4ESS switch can serve as the subscriber table 40.

The originating switch 30 communicates with a wireless carrier 20, the terminating switch 70 and a PCP database 60, preferably located at a Network Control Point (NCP). The PCP database 60 contains the telephone numbers of all PCP subscribers, regardless of area code. The AT&T number 2 Direct Services ANI-based/number 2 NCP (2DSA/2NCP) can be used as such a database. The terminating switch 70 communicates with a Local Exchange Carrier (LEC) 80 to complete the telephone call to the destination 82.

When a user makes a long distance telephone call from a wireless telephone 10, the call is sent from a wireless carrier 20 through, for example, a MTSO or MSC to the originating switch 30. After determining if the user is a PCP service subscriber, as explained in detail with respect to FIGS. 2 and 3, the call is routed through the terminating switch 70 to the LEC 80 and the long distance telephone call is completed.

Figure 2:
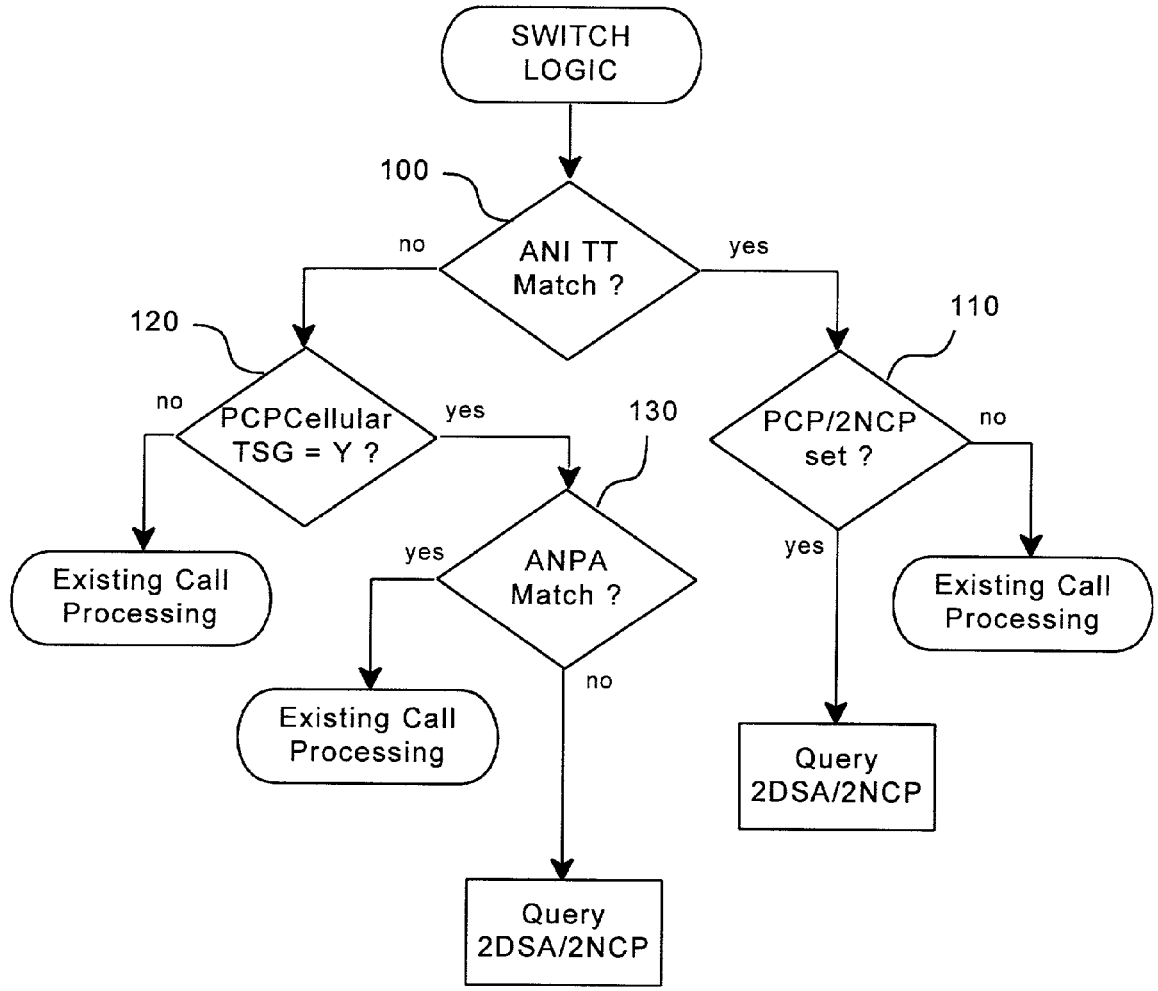
FIG. 2 is a block flow diagram of steps performed by a communications switch in accordance with an embodiment of the invention.

Refer now to FIG. 2, showing a block flow diagram of the steps performed by the originating switch 30 in accordance with an embodiment of the invention. Initially, at step 100 the switch determines if the telephone number of the user making the long distance call is included in the ANI trigger table. If the user's telephone number is found in the ANI trigger table, the switch checks the state of the PCP/2NCP flag in the ANI trigger table at step 110 because the user's telephone number may be included in the ANI trigger table for another reason. The user may, for example, subscribe to a different communications service feature. If the PCP/2NCP flag is false at step 110, the user is not a subscriber and no PCP service is provided. Instead, existing non-PCP call processing is performed. If the PCP/2NCP flag is true at step 110, the user is a PCP subscriber and the switch queries the 2DSA/2NCP database to determine the details of that user's PCP plan.

If the user's telephone number was not found in the ANI trigger table at step 100, the switch checks the PCPWireless Trunk Sub-Group (TSG) flag at step 120. The PCPWireless TSG flag indicates if the wireless provider controls the user's billing records, such as Automatic Message Accounting (AMA) records. Control of a user's billing records is also referred to as "recording take back." If the PCPWireless TSG flag is false at step 120, the provider does not control the user's billing records and account codes entered by the user would not appear on the user's bill. Therefore, no PCP service is provided in this situation.

If the user's telephone number was not found in the ANI trigger table at step 100 and the PCPWireless TSG flag indicates that the provider does control the user's billing records at step 120, PCP service could still be provided if it can be determined that the user is a subscriber. Therefore, at step 130 the switch compares the user's area code to the area codes in the access NPA table. If the switch finds the user's area code in the access NPA table at step 130, the switch has determined that the user's phone number is not in the ANI trigger table and that the user's phone number should appear in the ANI trigger table if the user is a PCP subscriber. Thus, the user is not a PCP subscriber and no PCP service is provided. If the switch does not find the user's area code in the access NPA table at step 130, the switch has determined that the user might be a subscriber making a long distance wireless telephone call from outside the geographic area of the user's normal originating switch. Therefore, the network control point 2DSA/2NCP database is queried, or "dipped," to determine whether or not the user is a subscriber, and whether or not PCP service can be provided, as described with respect to FIG. 3.

Figure 3:
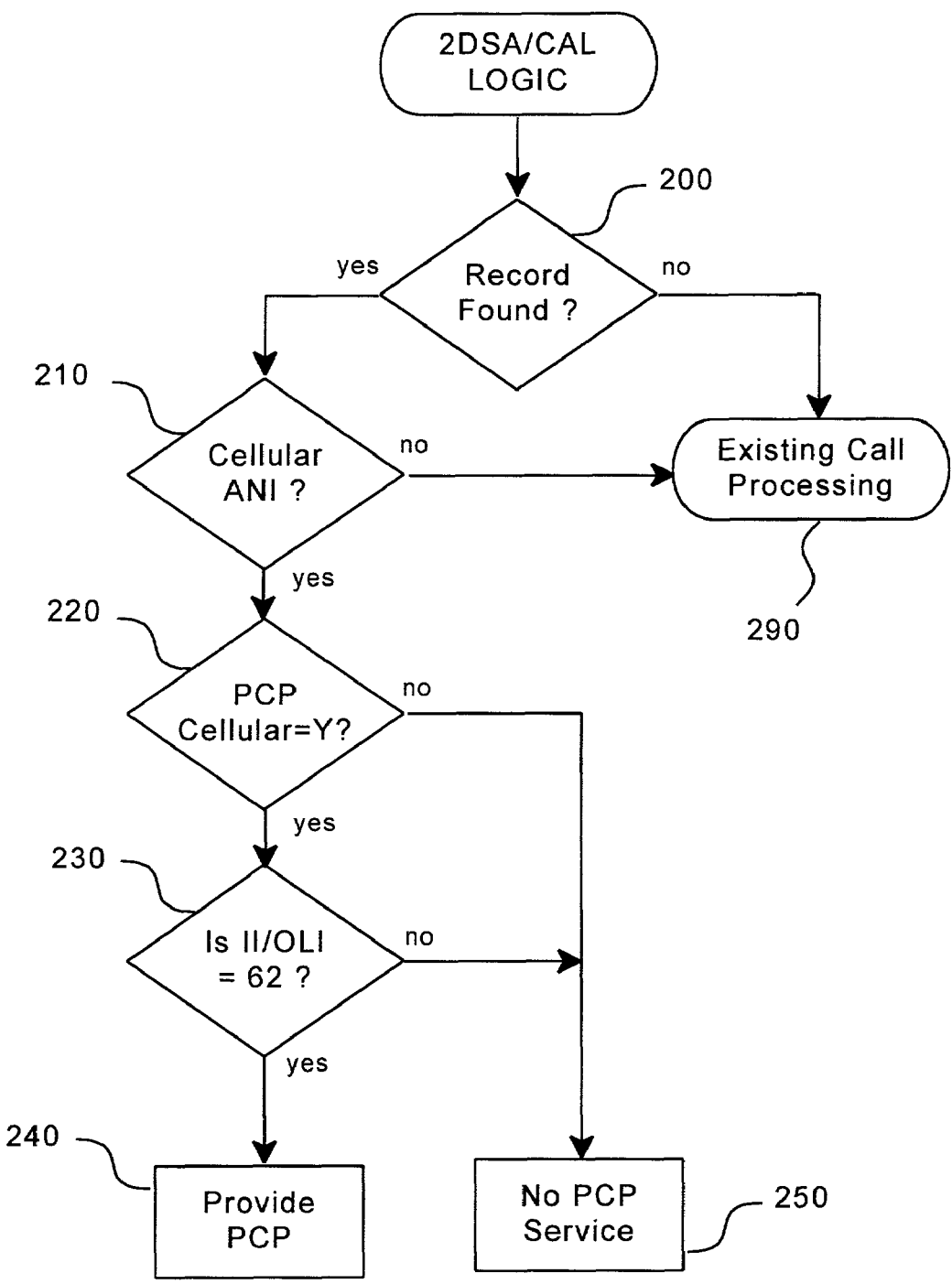
FIG. 3 is a block flow diagram of steps performed when querying a communications service feature database in accordance with an embodiment of the invention.

FIG. 3 is a block flow diagram of the steps performed when querying the PCP database 60 in accordance with an embodiment of the invention. If no customer record is found in the PCP database at step 200, or if the telephone call is found to be not from a wireless subscriber at step 210, existing call processing is performed at step 290. If a customer record is found in the PCP database and it is from a wireless subscriber, the PCPWireless flag is checked at step 220. The PCPWireless flag can be received in the Transaction Capabilities Part (TCAP) begin message from a communications switch. In general, TCAP is a Signaling System number 7 (SS7) protocol that provides a set of tools that can be used by an application at one node to invoke execution of a processing at another node, and exchange the results. Similar information could be obtained using other protocols, such as Transmission Control Protocol/Internet Protocol (TCP/IP). The PCPWireless flag indicates whether or not the provider controls the user's billing records. If the PCPWireless flag is false at step 220, the provider does not control the user's billing records and no PCP service is provided as explained with respect to step 120.

If it is determined at step 220 that the provider does control the user's billing records, the Information Indicator/Originating Line Information (II/OLI) code is then checked at step 230. The II/OLI code is part of a protocol used when long distance telephone call signals are transferred between carriers. If the II/OLI code indicates type 2A wireless access (represented by an II/OLI code of "62"), PCP service is provided at step 240. If, on the other hand, the II/OLI code indicates type 1 access (II/OLI=61), the LEC and MTSO/MSC are connected via a line side connection. As a result, the provider will not know the user's telephone number and cannot determine if the user is a subscriber. Therefore, no PCP service is provided at step 250. Similarly, if the II/OLI code indicates call delivery to a roamer wireless telephone (II/OLI=63), the telephone number associated with the long distance telephone call is that of the receiving party, not that of the party making the telephone call. For example, when a party is roaming outside their home area and an incoming call is forwarded by the MTSO/MSC to the roaming location, the cost of the long distance call is billed to the party receiving the call instead of the party making the call. In this case, the phone number given to the network provider represents the party receiving the call. Because the provider does not know the calling party's telephone number, it cannot be determined if the user is a subscriber and no PCP service is provided at step 250.

Although various embodiments are specifically illustrated and described herein, it will be appreciated that modifications and variations of the present invention are covered by the above teachings and within the purview of the appended claims without departing from the spirit and intended scope of the invention. For example, although one embodiment of the invention involves PCP, it can be appreciated that another communications service feature could be provided and still fall within the scope of the invention.

What is claimed is:

1. A method for providing a communications service feature to a party communicating through a network, comprising:
   determining, by a communications switch, whether the party is a subscriber of the communications service feature based on an identifier associated with the party and a first database containing a subset of subscriber identifiers;
   verifying, by the communications switch, that the identifier associated with the party is in a subset of subscriber identifiers that would be included in the first database if the party is a subscriber;
   querying, by the communications switch, a second database containing all of the subscriber identifiers to determine whether the party is a subscriber when the identifier associated with the party is not in the first database and is not in the subset of subscriber identifiers that would be included in the first database if the party is a subscriber; and
   providing the communications service feature if the party is a subscriber.

2. The method of claim 1,
   wherein the network is a public switched telephone network.

3. The method of claim 2,
   wherein the identifier associated with the party and the subscriber identifiers are telephone numbers.

4. The method of claim 3,
   wherein the communications service feature is positive call processing.

5. The method of claim 3,
   wherein the first database stores subscriber telephone numbers for a plurality of area codes, and the subset of subscriber identifiers that would be included in the first database if the party is a subscriber includes subscriber telephone numbers having one of the plurality of area codes.

6. The method of claim 5,
   wherein subscriber telephone numbers that are not stored in the first database and that do not have one of the plurality of area codes represent calls that are not associated with a specified geographic region.

7. The method of claim 3,
   wherein the determining uses an automatic number identification trigger table stored in the communications switch.

8. The method of claim 5,
   wherein the verifying uses an access number plan area table stored in the communications switch.

9. The method of claim 4,
   wherein the communications service feature is provided by a provider, and
   wherein the providing further includes verifying that the provider controls information for billing the party, and
   wherein providing positive call processing is performed if the party is a subscriber and the provider controls the information for billing the party.

10. The method of claim 9,
    wherein verifying that the provider controls the information for billing the party is based on a transaction capabilities part begin message from a number 4 electronic switching system switch.

11. The method of claim 6, further comprising:
    determining whether a wireless telephone number for which the communications service feature is to be provided is associated with the party,
    wherein providing the communications service feature is performed when the wireless telephone number for which the communications service feature is to be provided is associated with the party and the party is a subscriber.

12. The method of claim 11,
    wherein determining whether the wireless telephone number for which the communications service is to be provided is associated with the party is based on an information indicator/originating line information code indicating type 2A access.

13. An apparatus for providing a communications service feature to a party communicating through a network, comprising:
    a communications switch that determines whether the party is a subscriber of the communications service feature based on an identifier associated with the party and a first database containing a subset of subscriber identifiers, that verifies the identifier associated with the party is in a subset of subscriber identifiers that would be included in the first database if the party is a subscriber, that queries a second database containing all of the subscriber identifiers to determine whether the party is a subscriber when the identifier associated with the party is not in the first database and is not in the subset of subscriber identifiers that would be included in the first database, wherein the communications service feature is provided if the party is a subscriber.

14. The apparatus of claim 13,
wherein the network is a public switched telephone network.

15. The apparatus of claim 14,
wherein the identifier associated with the party and the subscriber identifiers are telephone numbers.

16. The apparatus of claim 15,
wherein the communications service feature is positive call processing.

17. The apparatus of claim 15,
wherein the first database stores subscriber telephone numbers for a plurality of area codes, and the subset of subscriber identifiers that would be included in the first database if the party is a subscriber are subscriber telephone numbers having one of the plurality of area codes.

18. The apparatus of claim 17,
wherein the telephone numbers that are not in the first database and that do not have one of the plurality of area codes represent wireless calls.

19. The apparatus of claim 15,
wherein the communications switch uses an automatic number identification trigger table stored in the communications switch.

20. The apparatus of claim 17,
wherein the communications switch uses an access number plan area table stored in the communications switch.

21. The apparatus of claim 16,
wherein the communications service feature is provided by a provider, and
wherein the provider verifies that the provider controls information for billing the party, and
wherein providing positive call processing is performed if the party is a subscriber and the provider controls the information for billing the party.

22. The apparatus of claim 21,
wherein verifying that the provider controls the information for billing the party is based on a transaction capabilities part begin message from the communications switch.

23. The apparatus of claim 18,
wherein the provider provides the communications service feature when a wireless telephone number for which the communications service feature is provideable is determined to be associated with the party and the party is a subscriber.

24. The apparatus of claim 23,
wherein determining that the wireless telephone number for which the communications service feature is provideable is associated with the party is based on an information indicator/originating line information code indicating type 2A access.

25. A system for determining whether a party communicating through a public switched telephone network is a subscriber of a communications service feature, comprising:
a communications switch serving a plurality of area codes, comprising:
an area code database containing each of the plurality of area codes, and
a first database containing a subset of subscriber telephone numbers each having one of the plurality of area codes;
a second database containing all of the subscriber telephone numbers; and
a processor in communication with the communications switch and the second database,
wherein the processor queries the second database to determine if the party is a subscriber when a telephone number associated with the party is not in the first database and an area code associated with the party is not in the area code database.

26. The system of claim 25,
wherein the communications service feature is positive call processing.

27. The system of claim 26,
wherein the first database is an automatic number identification trigger table.

28. The system of claim 27,
wherein the area code database is an access number plan area table.

29. The system of claim 27,
wherein the communications service feature is provided by a provider and the processor verifies that the provider controls information for billing the party.

30. The system of claim 29,
wherein the processor determines whether a wireless telephone number for which the communications service feature is provideable is associated with the party.

31. The system of claim 30,
wherein the processor determines whether the wireless telephone number for which the communications service feature is provideable is associated with the party based on an information indicator/originating line information code indicating type 2A access.

32. A method for providing a communications service feature to a party communicating through a network, comprising:
determining, by a communications switch, whether the party is a subscriber of the communications service feature based on a telephone number associated with the party and a first database containing a subset of subscriber telephone numbers based on area codes associated with the subscriber telephone numbers;
verifying, by the communications switch, that the telephone number associated with the party has an area code such that the telephone number would be included in the first database if the party is a subscriber;
querying, by the communications switch, a second database containing all of the subscriber telephone numbers to determine if the party is a subscriber when the telephone number associated with the party represents a call that is not associated with a specified geographic region, is not in the first database and is not in the subset of telephone numbers that would be included in the first database; and
providing the communications service feature if the party is a subscriber.

33. The method of claim 32,
wherein the network is a public switched telephone network.

34. The method of claim 33,
wherein the communications service feature is positive call processing.

35. An apparatus for providing a communications service feature to a party communicating through a network, comprising:

a communications switch that determines whether the party is a subscriber of the communications service feature based on a telephone number associated with the party and a first database containing a subset of subscriber telephone numbers based on area codes associated with the subscriber telephone numbers, that verifies that the telephone number associated with the party has an area code such that the telephone number would be included in the first database if the party is a subscriber, that queries a second database containing all of the subscriber telephone numbers to determine if the party is a subscriber when the telephone number associated with the party represents a call that is not associated with a specified geographic region, is not in the first database and is not in the subset of telephone numbers that would be included in the first database, wherein the communications service feature is provided if the party is a subscriber.

36. The apparatus of claim 35,
wherein the network is a public switched telephone network.

37. The apparatus of claim 36,
wherein the communications service feature is positive call processing.

* * * * *